C. L. ROBERTS.
CORRUGATOR.
APPLICATION FILED APR. 26, 1917.

1,324,210.

Patented Dec. 9, 1919.

Witnesses
C. C. Walling
E. L. Mueller

Inventor
C. L. Roberts

Attorney

UNITED STATES PATENT OFFICE.

CLARK L. ROBERTS, OF CALDWELL, IDAHO.

CORRUGATOR.

1,324,210.  Specification of Letters Patent.  Patented Dec. 9, 1919.

Application filed April 26, 1917. Serial No. 164,642.

*To all whom it may concern:*

Be it known that I, CLARK L. ROBERTS, a citizen of the United States, residing at Caldwell, in the county of Canyon, State of Idaho, have invented certain new and useful Improvements in Corrugators; and I do hereby declare the following to be a full, clear, and exact description of the invention, such as will enable others skilled in the art to which it appertains to make and use the same.

This invention is an improvement in agricultural machines and has particular reference to a corrugator.

An object of the invention is to provide an improved corrugator of simple construction employed to form and shape irrigating ditches.

Another object is to render the plows and shape the wheels of the machine adjustable relative to each other to vary the distance between ditches.

The inventive idea involved is capable of receiving a variety of mechanical expressions, one of which, for the purpose of illustrating the invention, is shown in the accompanying drawing, wherein:—

Figure 1:
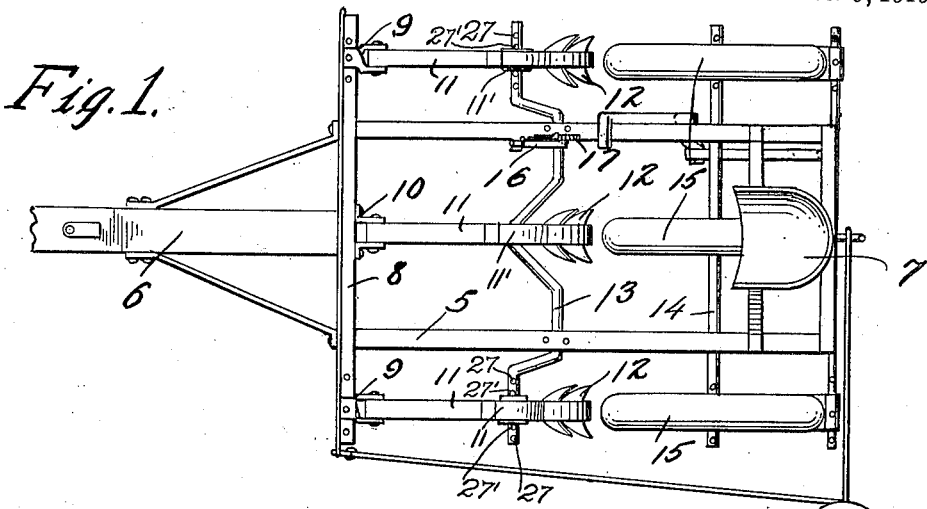
Figure 1 is a top plan view of the corrugator constructed in accordance with the invention.
Figure 2:
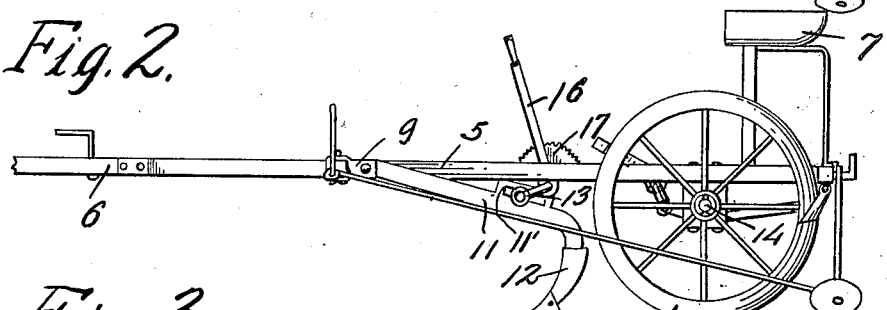
Fig. 2 is a side elevation thereof.
Figure 3:
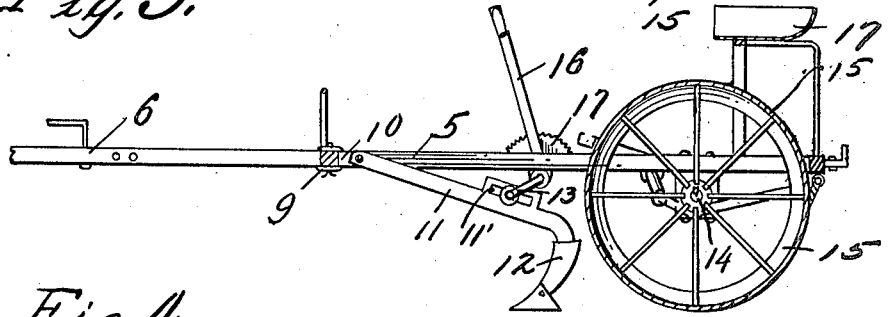
Fig. 3 is a longitudinal section.
Figure 4:
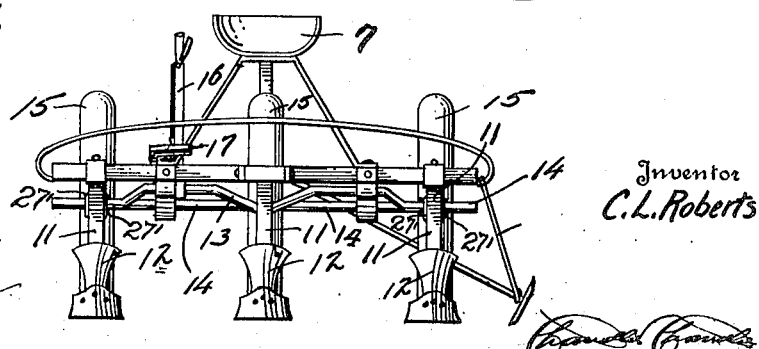
Fig. 4 is an end elevation.

The invention is illustrated in what is now believed to be its preferred form and comprises a frame 5 having the usual draft appliance 6 connected thereto at its forward end, and provided with an operator's seat 7 at its rear end. The frame 5 is further provided at its forward end with a transverse beam 8, to the ends of which are detachably secured the couplings 9 which are adjustable longitudinally of said beam to vary the distances between the same and the intermediate fixed coupling 10 also carried by the beam. Each of the couplings 9 and 10 has connected thereto the forward end of a plow beam 11 provided with the usual plow 12 which may be of any preferred construction. The frame 5 has journaled therein a crank shaft 13, the crank portions of which engage elongated slotted extensions 11' on the upper portions of the adjacent plow beams, the outer of which are adjustable laterally upon the ends of said shaft.

The outer ends of the crank shaft are formed with openings 27 for the reception of the retaining pins 27', for the purpose of holding the outer beams in their adjusted positions on the shaft.

Rearwardly of the shaft 13 the frame 5 has journaled therein a second shaft 14 upon which are mounted a plurality of shaping wheels 15 corresponding in number to the number of plows and arranged in longitudinal alinement therewith so that the same will follow the plows in making a ditch in order to compress the walls thereof. The tread portion of each wheel 15 is substantially semi-circular in cross section and the intermediate wheel is fixed to the shaft 14 while the outer wheels are adjustable longitudinally thereof to vary the distance beneath said wheels in accordance with the distances between the plows.

In order to vary the depth to which the plows 12 extend into the ground the shaft 13 has secured thereto a lever 16 adapted to rotate said shaft and coöperating with a segmental rack 17 for the purpose of holding a lever in adjusted position.

What is claimed is:—

A corrugator including a frame having a transverse beam, a plow beam pivoted to the intermediate portion of the transverse beam, a plow beam pivoted to each end portion of the transverse beam and adjustable longitudinally thereon, so as to vary the distances between the intermediate and side beams, a transverse shaft mounted on the frame and having a plurality of crank portions, each of the plow beams having a longitudinally slotted extension on its upper side receiving one of said crank portions, means for rocking the shaft to raise and lower the plow beams, the ends of the crank shaft being provided with means engaging on each side of the outer plow beams for holding said plow beams at different longitudinal adjusted positions on said shaft and whereby the outer plow beams are disposed at different distances from the intermediate plow beam.

In testimony whereof I affix my signature in the presence of two witnesses.

CLARK L. ROBERTS.

Witnesses:
J. A. TURNER,
W. P. LYON.